United States Patent [19]

Arai et al.

[11] Patent Number: 4,910,614
[45] Date of Patent: Mar. 20, 1990

[54] DISK CONTROLLER FOR A PLURALITY OF MAGNETIC DISK DRIVES

[75] Inventors: Tomohisa Arai; Yukinori Sugiyama, both of Tokyo, Japan

[73] Assignee: NEC Corporation, Tokyo, Japan

[21] Appl. No.: 117,994

[22] Filed: Nov. 9, 1987

[30] Foreign Application Priority Data

Nov. 7, 1986 [JP] Japan .............................. 61-265863

[51] Int. Cl.⁴ ............................................. G11B 17/00
[52] U.S. Cl. ................................................... 360/69
[58] Field of Search .................................... 360/69, 79

[56] References Cited

U.S. PATENT DOCUMENTS 4,583,133  4/1986  Shoji et al. ............................ 360/69

OTHER PUBLICATIONS

*Disk Control Products Specification Booklet,* Advanced Micro Devices, 1984, pp. 1-39.

Primary Examiner—John H. Wolff
Attorney, Agent, or Firm—Foley & Lardner, Schwartz, Jeffery, Schwaab, Mack, Blumenthal & Evans

[57] ABSTRACT

A disk controller for a plurality of disk drives is disclosed. This controller includes a plurality of first memory units, the number of which is equal to the number of the disk drives and each of which stores a group number representative of a kind of the associated disk drives, and further includes a plurality of sets of second memory units, the number of which is equal to the number of the kinds of the disk drives and each of which stores control parameters used for controlling the associated kind of the disk drives. One of the first memory units is accessed in response to a disk drive selecting signal and one of the sets of second memory units is selected in response to the group number read out from the accessed first memory units. The controlled parameters stored in the selected set of second memory units are thereby read out to control the disk drive.

8 Claims, 2 Drawing Sheets

DISK CONTROLLER FOR A PLURALITY OF MAGNETIC DISK DRIVES

BACKGROUND OF THE INVENTION

The present invention relates to a disk controller for a plurality of magnetic disk drives and more particularly to a controller for controlling magnetic disk drives of the same kind.

A disk controller is employed as a peripheral controller of a host processor to control data communication between the host processor and a magnetic disk drive (called hereinafter simply "disk drive"). In order to attain the optimum control according to a standard and/or performance of a disk drive, the disk controller requires various control parameters such as a data length per one sector, the number of sectors per one track, error detection and correction, etc. For this purpose, a set of registers are provided to store such control parameters.

The disk controller is frequently required to control a number of disk drives of different control parameters with some of the disk drives having the same control parameters. The control parameters should be changed as the kind of the disk drive to be controlled is changed.

SUMMARY OF THE INVENTION

Therefore, an object of the present invention is to provide a disk controller which can control a plurality of disk drives of different control parameters.

Another object of the present invention is to provide a disk controller for a plurality of disk drives having a simplified circuit construction.

Still another object of the present invention is to provide a disk controller for a plurality of disk drives which can set control parameters responsive to a disk drive to be controlled.

According to the present invention, there is provided a disk controller or a plurality of disk drives, comprising a plurality of sets of memory unit, each set having a group number assigned thereto and storing control parameters used for controlling one or more disk drives grouped by the same control parameters, first unit responsive to a disk designating signal for producing one of the group numbers assigned to the sets of memory unit, second unit responsive to the group number produced by the first unit for selecting one of the sets of memory unit having the group number equal to the group number produced by the first unit, and third unit for reading out the control parameters stored in the selected set of memory unit.

Thus, the disk controller according to the present invention groups a plurality of disk drives to be controlled into those which have the same control parameters and stores the respective control parameters in a plurality of sets of memory unit allotted to the respective groups. Accordingly, the number of the sets of memory unit is smaller than the number of the disk drives to be controlled. The circuit construction of the disk controller is thereby simplified. The disk designating signal from a CPU is supplied to a decoding units where a group selecting signal to select one of the memory units is produced in accordance with the disk designating signal. One of memory units is thus selected. The control parameters stored in the selected set of memory units are then read out. The disk controller uses the read out control parameters to control the designated disk drive.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 1:
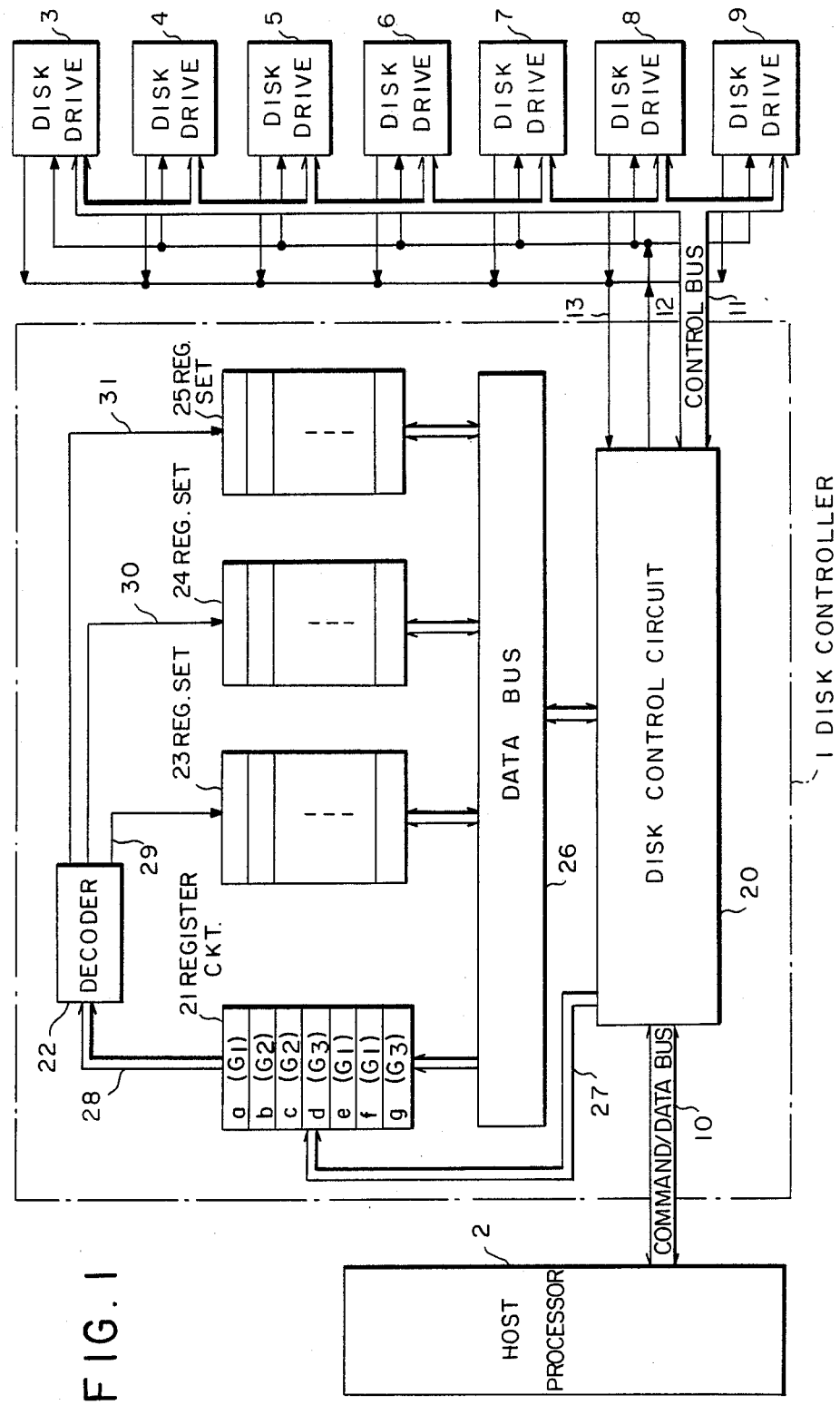
FIG. 1 is a block diagram showing an embodiment of the present invention.

Referring to FIG. 1, a disk controller 1 according to one embodiment of the present invention is formed as a single chip monolithic integrated circuit device and is coupled to a host processor 2 via a command/data bus 10. The disk controller 1 is further coupled to each of seven disk drives 3 to 9 via a control bus 11, a serial data output line 12 and a serial data input line 13. The host processor 2 supplies a command signal to the disk controller 1 via the bus 10 and sometimes supplies a parallel data to the disk controller 1 along with the command signal. The disk controller 1 includes a disk control circuit 20 which has a CPU (not shown) to decode the supplied command signal and to convert the supplied parallel data signal into a serial data signal. When the command signal includes data-write instruction, the disk control circuit 20 supplies the converted serial data signal to a selected one of the disk drives 3 to 9 via the serial data output line 12. The selection of the disk drives 3 to 9 is carried out via the control bus 11 by the control circuit 20. Therefore, the control bus 11 includes disk drive selection signal lines and further includes data read/write control signal lines, seek control signal lines, and head moving-direction and position control lines. When the command signal supplied from the host processor 2 includes data-read instruction, the disk control circuit 20 receives the read-out serial data from the selected disk drive via the serial data input line 13 and converts it into a parallel data which is in turn supplied to the host processor 2 via the bus 10.

As is well-known in the art, in order to control the selected one of the disk drives 3 to 7, the disk control circuit 20 requires control parameters such as the data (bit) length per one sector, the number of sectors per one track, error detection and correction, etc. responsive to the selected disk drive. Therefore, when a newly selected disk drive has different control parameters, the control parameters corroding to the newly selected disk drive should be supplied to the disk control circuit 20.

For this purpose, the disk controller 1 further includes a register circuit 21, a decoder 22, and three sets of registers 23, 24 and 25 in accordance with the present invention. Moreover, three kinds of disk drives are employed in this embodiment. That is, the first, fifth and sixth disk drives 3, 7 and 8 are of a first kind and have the same control parameters, and the second and third disk drives 4 and 5 are of a second kind and have control parameters equal to each other and different from those of the first kind, the fourth and seventh disk drives 6 and 7 being of a third kind and having control parameters equal to each other and different from those of the first and second kinds. The first set of registers 23 store therein the above-mentioned control parameters used for controlling the first kind of disk drives 3, 7 and 8, and the second set of registers 24 stores therein the control parameters used for controlling the second kind of disk drives 4 and 5. The control parameters of the third kind of disk drives 6 and 9 are stored in the third set of registers 25. Moreover, the first, second and third sets of registers 23, 24 and 25 are assigned to first, second and third group numbers $G_1$, $G_2$ and $G_3$, respectively. In other words, the seven disk drives 3 to 9 are divided into three groups in accordance with the control parameters and the respective control parameters are stored into the respective sets of registers 23, 24 and 25. The register circuit 21 has the same number of registers as the number of disk drives 3 to 9, i.e. seven registers a to g. The a-register to g-register correspond respectively to the first to seventh disk drives 3 to 9 and hence store therein the first group number $G_1$, the second group number $G_2$, the second group number $G_2$, the third group number $G_3$, the first group number $G_1$, the first group number $G_1$, and the third group number $G_3$, respectively. One of the registers is accessed by a disk designating signal supplied via a bus 27 from the disk control circuit 20 and the group number stored in the accessed register is read out and then supplied to the decoder 22 via a bus 28. The decoder 22 decodes the read-out group number and selects via one of selection lines 29 to 30 one of the first to third sets of registers 23 to 25 which has the group number equal to the read-out group number. The control parameters stored in the selected set of registers 23, 24 or 25 are read out and then supplied via a data bus 26 to the disk control circuit 20.

In an initial state, the host processor 2 supplies three sets of the control parameters to the disk control circuit 20 via the command/data bus 10. The disk control circuit 20 writes these three sets of the control parameters into the first to third sets of registers 23 to 25, respectively, via the data bus 26. The host processor 2 further supplies via the command/data bus 10 the group numbers $G_1$, $G_2$, $G_2$, $G_3$, $G_1$, $G_1$ and $G_3$ in that order, which are in turn written respectively into the a-register to g-register by the disk control circuit via the data bus 26. If desired, the writing of each set of control parameters and each group number may be carried out by a keyboard (not shown). The disk controller 1 is thus brought into an operable condition.

In operation, the host processor 2 supplies to the disk controller 1 a command signal having data-read instruction and address information. The disk control circuit 20 detects from the supplied command signal which disk drive stores data designated by the address information and supplies a disk drive designating signal to the register circuit 21 via the bus 27. Assuming that the first disk drive stores the data designated by the address information, the a-register in the register circuit 21 is selected and the group number $G_1$ stored therein is supplied to the decoder 22. As a result, the first set of registers 23 are selected by the decoder 22 and the control parameters stored therein are read out and then supplied to the disk control circuit 20 via the data bus 26. The disk control circuit 20 detects, based on the supplied control parameters such as the data length per one sector, the number of sectors per one track, etc., which track in the first disk drive 3 stores the data designated by the address information and supplies head moving direction and position data to the first disk drive 3 via the control bus 11 along with the disk drive selecting signal, data-read signal and the seek control signal. The first disk drive 3 is thereby selected and the data on the designated track is read out serially to the disk control circuit 20 via the serial data input line 13. The disk control circuit 20 detects an error of the serially supplied data and corrects it in accordance with the error detection and correction information of the read-out control parameters. Finally, the disk control circuit 20 picks up only the data designated by the address information and converts it into a parallel data which is in turn supplied to the hose processor 2 via the bus 10.

When the host processor 2 supplies another command signal including a data-write instruction, address information and a data, the disk control circuit 20 detects a disk drive in which the data is to be written, and supplies a disk drive designating signal to the register circuit 21. Assuming that the fourth disk drive 6 is to be selected, the group number $G_3$ stored in the d-register is read out and then supplied to the decoder 22. The third set of registers 25 are thus selected and the control parameters stored therein are read out to be supplied to the disk control circuit 20. Thus, the fourth disk drive 6 is controlled by the circuit 20, based on the control parameters read-out from the third set of registers 25.

Since the seven disk drives 3 to 9 are grouped into those having the same control parameters, seven sets of registers are not necessary. They are controlled by employing only three sets of registers 23, 24 and 25. If the seventh disk drive 9 is replaced by the second kind of disk drive, this disk drive can be controlled only by writing the second group number $G_2$ into the g-register of the register circuit 21.

Figure 2:
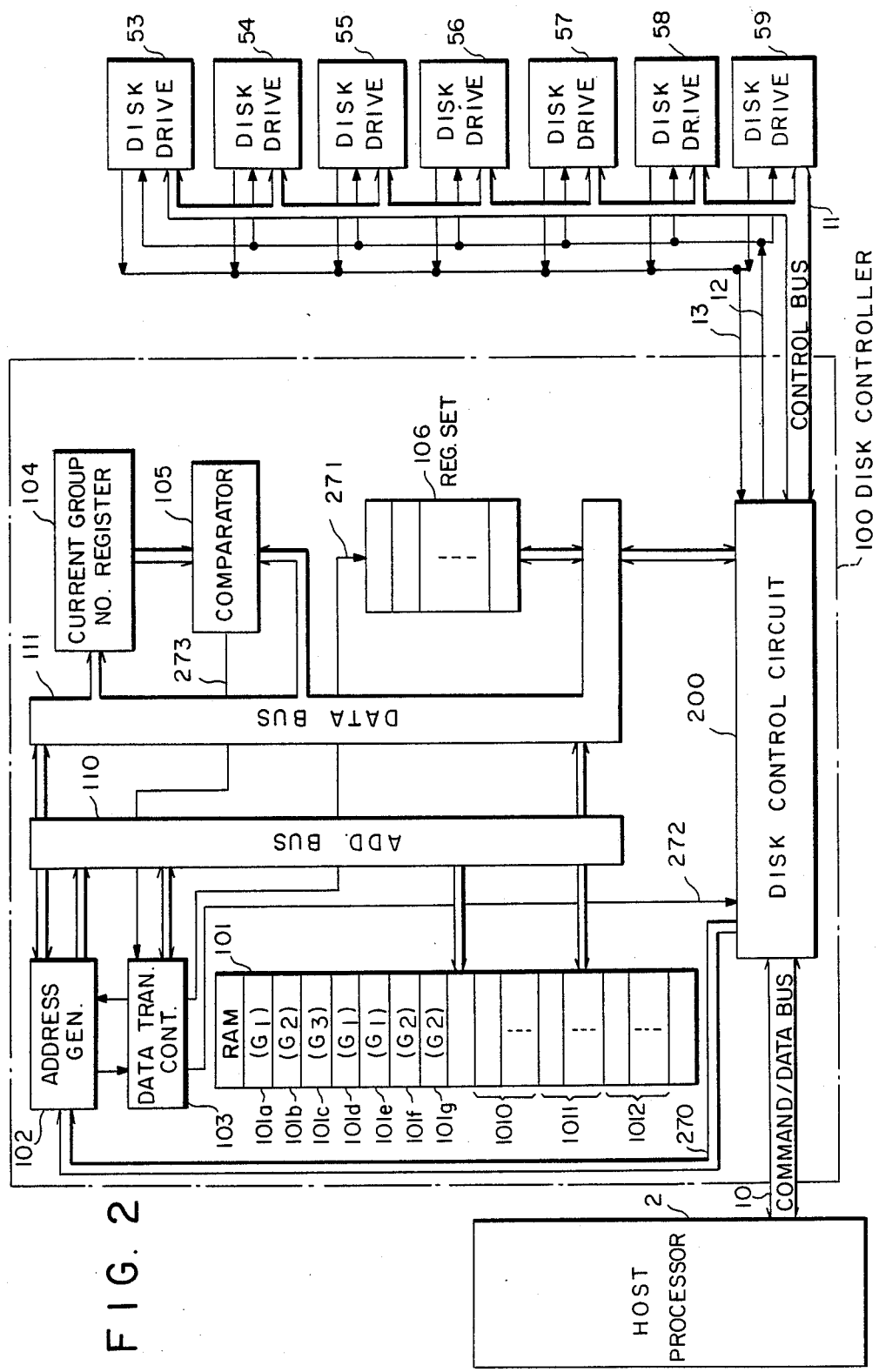
FIG. 2 is a block diagram showing another embodiment of the present invention.

Referring to FIG. 2, a disk controller 100 according to another embodiment of the present invention is formed as a single chip monolithic integrated circuit device. This disk controller 100 includes a random access memory (called hereinafter "RAM") 101 having seven memory locations $101a$ to $101g$ corresponding respectively to seven disk drives 53 to 59. Each of the memory locations $101a$ to $101g$ stores a group number $G_1$, $G_2$ or $G_3$ as shown. The RAM 101 further has three sets of memory locations 1010, 1011 and 1012. The first set of memory locations 1010 store control parameters for controlling a first kind of disk drives 53, 56 and 57, and the second set of memory locations 1011 store control parameters for controlling a second kind of disk drives 54, 58 and 59, the third set of memory locations 1012 storing control parameters for controlling a third of disk drive 55.

Assuming that the disk control circuit 200 is in a state of controlling the first disk drive 53, a set of registers 106 store the control parameters read out from the first set of memory locations 1011 in the RAM 101 and a current group number register 104 stores the first group number $G_1$.

When the host processor 2 supplies a new command signal to the disk control circuit 200 to control the fifth disk drive 57, the disk control circuit 200 supplies a disk drive designating signal to an address generator 102 via a signal bus 270. The address generator 102 responds to the supplied disk drive designating signal and generates address information of the address location $101e$ of the RAM 101. This address information is supplied to a data transferring control circuit 103 and the RAM 101 via an address bus 110. The content of the address location $101e$, i.e. the group number $G_1$, is thereby read out and then supplied to one input terminal of a comparator 105 via a data bus 111. The other input terminal of the comparator 105 receives the content of the current group number register 104, i.e. the group number $G_1$. The comparator 105 thus supplies an identical signal to the data transferring control circuit 103 via a signal line 273. Accordingly, the data transferring control circuit 103 changes signal lines 271 and 272 to an active level (a high level), so that the control parameters stored in the set of regisgers 106 is read out and then supplied to the disk control circuit 200 via the data bus 111 without accessing the first set of memory locations 1010 of the RAM 101. The read-out speed of the control parameters is thus improved.

In a case where the disk controller 100 controls the second disk drive 54, the address generator 102 generates address information of the memory location 101b of the RAM 101 in response to a disk drive designating signal from the disk control circuit 200. The content of the memory location 101b, i.e. the second group number $G_2$, is read out ad then supplied to the comparator 105 via the data bus 111. Since the current group number register 104 stores the first group number $G_1$, the comparator 105 does not supply the identical signal to the data transferring control circuit 103. Accordingly, the circuit 103 supplies the group number $G_2$ read out from the memory location 101b to the address generator 102 and writes it into the current group number register 104. The address generator 102 generates address information of the second set of memory locations 1011 of the RAM 101 in response to the group number $G_2$ and supplies them to the RAM 101 via the address bus 110. The control parameters for the second kind of the disk drives 54, 58 and 59 are thus read out and then supplied to the set of registers 106 and the disk control circuit 200. Thus, the disk control circuit 200 controls the second disk drive 54 in response to the supplied control parameters.

As described above, the disk controller according to the present invention can control a plurality of disk drives with a simplified circuit construction.

The present invention is not limited to the above-mentioned embodiments, but may be modified and changed without departing from the scope and spirit of the invention. For example, the number of disk drives to be controlled and the number of sets of memory means can be changed.

What is claimed is:

1. A disk controller for a plurality of magnetic disk drives, comprising a plurality of sets of memory means, each set of said plurality of sets of memory means having a group number assigned thereto and storing control parameters used for controlling one or more magnetic disk drives, first means responsive to disk drive designating information for producing one of the group numbers assigned respectively to said plurality of sets of memory means, second means responsive to the group number produced by said first means for selecting one of said plurality of sets of memory means which has the group number equal to the group number produced by said first means, and means for reading out the control parameters stored in the selected set of memory means.

2. The disk controller as claimed in claim 1, wherein the control parameters stored in each set of memory means include information of a data length per one sector, a number of sectors per one track and an error detection and correction.

3. The disk controller as claimed in claim 1, wherein each of said plurality of sets of memory means includes a plurality of registers.

4. The disk controller as claimed in claim 1, wherein said plurality of sets of memory means are an random access memory.

5. A disk controller for a plurality of disk drives wherein one or more disk drives require a first set of control parameters and two or more disk drives require a second set of control parameters different from said first set of control parameters, comprising one or more first memory means each storing a first group number, two or more second memory means each storing a second group number, a first set of memory means storing said first set of control parameters, a second set of memory means storing said second set of control parameters, means for accessing one of said first and second means to read out the group number stored therein, means responsive to the read-out group number for selecting one of said first and second sets of memory means to read out the control parameters stored therein, and means responsive to the read-out control parameters for controlling one of said disk drives.

6. The disk controller as claimed in claim 5, wherein the number of said first memory means is equal to the number of said disk drives requiring said first set of control parameters and the number of said second memory means is equal to the number of said disk drives requiring said second set of control parameters.

7. A disk controller for a plurality of disk drives, comprising a plurality of first means corresponding respectively to said disk drives and each storing a group number representative of a kind of each disk drive, respectively, a plurality of sets of second memory means, the number of said plurality of sets of second memory means being equal to the number of the kinds of said disk drives and each of said plurality of sets of second memory means storing control parameters used for controlling each kind of said disk drives, means responsive to a disk drive designating signal for accessing one of said first memory means to read out the group number of the accessed first memory means, and means responsive to the read-out group number for selecting one of said plurality sets of second memory means to read out the control parameters stored in the selected set of second memory means.

8. The disk controller as claimed in claim 7, further comprising means for selecting one of said disk drives to control the selected disk drive in response to the read-out control parameters.

* * * * *